United States Patent Office 3,352,664
Patented Nov. 14, 1967

3,352,664
VISCOSITY STABLE INSECTICIDAL AND
HERBICIDAL COMPOSITIONS
Kenneth Gordon Nolan, Yardley, Pa., and Ilse Beatrice
Frederick and D. Lyle Goleman, Trenton, N.J., assignors to American Cyanamid Company, Stamford, Conn.,
a corporation of Maine
No Drawing. Filed Dec. 16, 1963, Ser. No. 330,537
15 Claims. (Cl. 71—110)

The present invention relates to novel insecticidal and herbicidal compositions and to methods of preparing such compositions. More particularly, it relates to novel liquid compositions characterized by both a low evaporation rate and a highly stable viscosity over a wide range of temperatures. Still more particularly, the invention is concerned with novel liquid compositions being both amenable to aerial application or distribution and effective for the control of insects and weeds.

The aerial distribution of insecticides and herbicides as presently practiced has been subject to serious limitations. For instance, where toxicants have been applied as finely divided dusts, such dusts have been subject to wind drift often causing irreparable damage to adjacent areas. Where aqueous formulations have been utilized, these have been found to be unsatisfactory in aerial application because of the large volume and heavy weight of solution required to achieve effective control. Further, such liquid droplets have the disadvantage of being subject to rapid evaporation during free fall and, therefore, become subject to wind drift as the droplet mass is reduced. Attempts to distribute highly concentrated solutions of phosphate insecticides and esters of phenoxy acetic acid herbicides have been entirely unsuccessful. These are poorly soluble in solvents usually employed for spray applications. Furthermore, such compositions are either solids as manufactured, i.e., in their technical state, or those which are liquid have such a wide range of viscosity over the temperature ranges at which aerial applications of such materials would normally be applied that uniform distribution of the concentrated materials has been virtually impossible.

It is geenrally found in field usage that in aerial applications temperatures of the toxicant materials can vary as much as about 70° F. It has been observed that with such variations there are dramatic concurrent variations in viscosity and flow rate of the insecticides and herbicides of technical grade. For instance, technical grade O,O-dimethylphosphorodithioate of diethyl mercaptosuccinate varies about 130 centipoises over the range of from 40° F. to 120° F. Further, technical grade dimethyl-1,2-dibromo-2,2-dichloroethylphosphate will vary some 65 centipoises and the butoxy ethanol ester of 2,4-dichlorophenoxy acetic acid will vary approximately 75 centipoises over the same temperature range. With such wide variations in viscosity, calibration of aerial equipment for application of technical grade materials is, of course, impractical and unfeasible, thereby severely restricting their use.

It is, therefore, a principal object of the invention to provide highly concentrated phosphate insecticide compositions and phenoxy acetic acid ester herbicide compositions stable to viscosity changes over a wide range of temperatures. It is a further object of the invention to provide insecticidal and herbicidal compositions which can be aerially distributed at a low volume rate. Other objects and advantages will become apparent from a consideration of the ensuing description.

According to the invention, it has been found that the viscosity of phosphate and penoxy acetic acid ester toxicants can be markedly stabilized by the addition thereto of at least about 5%, and preferably from about 20% to 50% by volume, of an aromatic additive which possesses the following critical characteristics:

(a) A mixed aniline point of above about 30° F. but not more than about 95° F.,
(b) An aromatic content ranging from about 60% to about 100%,
(c) A specific gravity at 60°/60° F. exceeding about 0.880 but not more than about 1.5,
(d) An evaporation rate not exceeding about 25% in six hours at 25° C. and 48% relative humidity (R.H.), and
(e) A flash point above about 125° F.

In general, a uniform flow rate of toxicant material over a wide range of temperatures is readily achieved, thereby permitting application of said toxicant material at a low, uniform, predetermined rate.

The aromatic additive defined above is critical. Where the additive fails to meet the requirements as to mixed aniline point or aromatic content, such additive is not sufficiently miscible with the toxicant contemplated herein to assure stabilization of its viscosity at low concentrations. Further, where the additive fails as to specific gravity and evaporation rate, accurate deposition of dispersed material therein is not assured. If flash point requirements are not met, ignition of the volatile diluent by the hot exhaust from the plane becomes an ever clear and present danger. Advantageously, the aromatic additives which fall within the purview of the present invention are commercially available, such as "Panasol AN-5," manufactured by Amoco Chemical Corporation of Chicago, Ill., "Socal 44-L," made by Standard Oil Company of California, "Esso-Han," made by the Humble Oil and Refining Company of Houston, Tex., "Highly Aromatic Solvent, Code DMN," made by the Golden Bear Oil Co. of Los Angeles, Calif., and "Light Cycle Oil," made by the Husky Oil Company of Cody, Wyo.

To overcome the above-enumerated difficulties, the compounds of the invention have heretofore been applied in low concentration at high volume rates as water emulsions, or dissolved in relatively large volumes of organic solvents such as kerosene, fuel oil or the like. These large volumes found necessary to produce desired insect or weed control, have created severe limitations of use in aerial application. Due to the excessively heavy weight and large volume of solution required for control, small planes have been found unsuitable in treating large acreage without frequent stops for reloading and refueling. Thus, larger but less maneuverable planes have been employed. This practice has necessitated distribution of materials from excessively high altitudes. Additional problems involving evaporation of the solvent additive and greater inaccuracy of deposition are ever present.

In the conventional practice employing, for instance, malathion as the toxicant, approximately one and one-half gallons of water containing a minimum of one pound per acre of active ingredient applied as a water emulsion are generally required for effective insect control. When applying hormone type herbicides for wood plant control, approximately ten gallons of emulsion containing one pound or more of active ingredient per acre are required for effective control. Examination of available control data indicates that with water emulsion application, rapid evaporation of the water can reduce the weight of the dispersed droplet during free fall to an extent which undesirably permits a large number of droplets to be carried away by wind drift from the site to be treated.

Surprisingly, the phosphate insecticides and esters of phenoxy acetic acid herbicides utilized in the present invention and suitable for low volume application can be prepared in novel liquid compositions having both relatively stable viscosities over a wide temperature range and low evaporation rates. It is even more surprising to discover that effective control can be achieved with such compositions applied at the rate of as little as one pint per acre of formulation containing eight ounces or less of active ingredient. Although the increase of activity of insecticides of the present invention may be attributed to increased deposition of the material at the described site, such activity can be attributable to synergistic effects produced by certain constituents present in the solvents of the invention. For instance, certain materials, such as alkyl-substituted benzene, naphtha and alkyl-substituted naphtha derivatives, present in the solvents described, probably potentiate the activity of the phosphate insecticide or the phenoxy acetic acid ester herbicide.

In general, aerial distribution equipment lends itself quite readily to adjustment and calibration. To the present, however, equipment has not been designed to cope adequately with wide variations in viscosity and flow rate of the material being applied. It is, therefore, essential to effective and uniform application of materials to control viscosity changes within narrow limits. Where pressure nozzles are employed, it has been detemined that all fluids must have a viscosity of less than about 108 centipoises, and preferably less than 65 centipoises, or 500 sec. Saybolt, if they are to be distributed effectively. As can be seen from Table I below, none of the toxicant materials per se can be used effectively at about 45° F.

TABLE I

| Toxicant | Viscosity (in cps.) | | |
|---|---|---|---|
| | 45° F. | 76° F. | 120° F. |
| Butoxy Ethanol Ester of 2,4-dichlorophenoxy acetic Acid | 190.2 | 49.5 | 14.6 |
| Dimethyl-1,2-dibromo-2,2-dichloroethyl phosphate | 79.6 | 31.1 | 15.9 |
| | 40° F. | | |
| O,O-Dimethylphosphorodithioate of diethyl mercaptosuccinate (Malathion) | 144 | 34 | 13 |

Further, while calibration of equipment can be accomplished on the ground for a particular temperature, as varying temperatures are inevitably encountered in flight, viscosity of the material will be altered and in turn produce an erratic flow rate and distribution pattern. With the addition of as little as 5% by volume of the aromatic additive as identified hereinabove, stabilization of the viscosity of the materials is noticeably enhanced. However, utilizing from 20% to 50% of the additive, markedly superior stabilization of viscosity is achieved.

The toxicants contemplated herein include:
(a) Phosphate insecticides of the general formula:

$$\begin{array}{c} R_1O \\ \diagdown \\ R_2 \end{array} \begin{array}{c} S \\ \| \\ P-X-R_3 \end{array}$$

wherein $R_1$ is lower alkyl; $R_2$ is alkyl, aryl or alkoxy; $R_3$ is substituted phenyl, unsubstituted or substituted alkyl or 5- to 6-membered nitrogen or sulfur heterocyclic radical, such as thiazolyl, pyridyl or pyrimidinyl; and X is oxygen or sulfur, and (b) Esters of phenoxy acetic acid as herbicides of the general formula:

[structure with $R_{4m}$, $[Cl]_n$, phenyl ring, $-O-C(Y)(H)-COOR_5$]

wherein $R_4$ is lower alkyl, chloroalkyl or chlorophenyl; $R_5$ is hydrogen, alkyl or alkoxyalkyl; Y is hydrogen or lower alkyl; $n$ is an integer from 1 to 3; and $m$ is an integer from 0 to 1.

Illustrative of the toxicants are:

O,O-dimethyl S-[1,2-bis(ethoxycarbonyl)ethyl] phosphorodithioate;
O,O-diethyl O-(2-isopropyl-4-methyl-6-pyrimidinyl) phosphorothioate;
O,O-diethyl S-(ethylthiomethyl) phosphorodithioate;
O,O-dimethyl S-(4-oxo-benzotriazine-3-methyl)-phosphorodithioate;
O,O-dimethyl O-(1-carbomethoxy-1-propen-2-yl) phosphorothioate;
O,O-dimethyl O-p-nitrophenyl phosphorothioate;
O,O-diethyl O-p-nitrophenyl phosphorothioate;
O,O-dimethyl O-(2-chloro-4-nitrophenyl) phosphorothioate;
O,O-dimethyl O-(3-chloro-4-nitrophenyl) phosphorothioate;
O,O-dimethyl O-(2,4,5-trichlorophenyl) phosphorothioate;
O,O-dimethyl O-(1-hydroxy-2,2,2-trichloroethyl) phosphorothioate;
O,O-dimethyl S-2-(ethylthio)isopropyl phosphorodithioate;
Isopropyl ester of 2,4-dichlorophenoxyacetic acid;
Butoxyethyl ester of 2,4-dichlorophenoxyacetic acid;
Isooctyl ester of 2,4,5-trichlorophenoxyacetic acid; and
Propylene glycol butylether ester of 2,4,5-trichlorophenoxyacetic acid.

In order to facilitate a further understanding of the invention, the following examples are presented primarily for purposes of illustrating certain more specific details thereof. The scope of the invention is not to be deemed limited thereby, except as defined in the claims. Unless otherwise stated, all parts are by volume. The aromatic additives which are employed in the ensuing examples are "Panasol AN-5," which possesses a specific gravity of 1.004, a flash point of 230° F., a mixed aniline point of 57° F., an aromatic content of 95% and an evaporation rate of 2% in six hours at 25° C. and 48% R.H.; "Socal 44–L" is characterized as having a specific gravity equal to 0.899, a flash point equal to 150° F., a mixed aniline point equal to 95° F. and 69% aromatics; "Highly Aromatic Solvent, Code DMN" is characterized as having a specific gravity equal to 0.9965, a flash point equal to 240° F., a mixed aniline point equal to 53.8° F. and 100% aromatics; "Esso-HAN" is characterized as having a specific gravity equal to 0.933, a flash point equal to 152° F., a mixed aniline point equal to 76.3° F. and 85% aromatics; "Light Cycle Oil" is characterized as having a specific gravity equal to 0.910, a flash point equal to 125° F., a mixed aniline point equal to 48.3° F. and 75% aromatics; and "Socal 44–L" is found to possess a specific gravity equal to 0.899, a flash point equal to 150° F., a mixed aniline point equal to 95° F. and 69% aromatics. Each of the examples utilizes the aforementioned aromatic additives in the manner set forth below.

*Example 1*

In the following example, ten ounces of 95% technical grade O,O-dimethyl phosphorodithioate of diethyl mercaptosuccinate are admixed with twenty-two ounces of a heavy aromatic diluent having a specific gravity of 1.004, a flash point of 230° F., a mixed aniline point of 57° F., an aromatic content of 95% and an evaporation rate of 2% in six hours at 25° C. and 48% relative humidity. This toxicant is applied at an elevation of about 50 feet by an airplane equipped with aerial spraying equipment to a grasshopper-infested location at a rate of one quart per acre. The material emanating from this elevation possesses an average size of approximately 100 microns. Splatter cards (five inches square) are placed randomly across the acreage to be treated and examined under a 10-power microscope after application. Upon examination, these cards show that approximately 163,296 droplets per square yard are deposited.

A grasshopper mortality count completed approximately eighteen hours after treatment indicates that approximately 95% grasshopper kill is effected.

Example 2

The procedure of Example 1 is repeated in every detail, except that a toxicant composition is prepared containing ten ounces of the above-identified compound and six ounces of the aromatic additive. Application of this composition to a grasshopper infested field at the rate of one pint per acre of the mixture is found to produce similarly a 95% grasshopper kill. The splatter cards placed randomly across the area are also examined under a 10-power microscope. These are found to contain droplets equivalent to approximately 38,880 droplets per square yard.

Example 3

Following the procedure set forth in Example 1 above, the composition is applied from an elevation of approximately 1,000 feet. Similar grasshopper kills are recorded.

Examples 4 to 24

Evidence of the dramatic change of the liquid viscosity of the compounds of the present invention as associated with the temperature change encountered under field conditions of aerial application is exemplified as illustrated in Table I above. The following tests purport to demonstrate the pronounced stabilizing effect of the compounds of the present invention by addition of at least about 5%, and preferably from about 20% to about 50%, of an aromatic additive possessing the characteristics described above.

Table I, as set forth above, provides viscosity data of undiluted toxicant at various temperatures. However, Table II below provides viscosity data of toxicant and 50% aromatic additive diluent at varying temperatures. Table III provides viscosity data of toxicant and heavy aromatic diluent of the instant invention and toxicant with solvents which meet the miscibility requirement of the additive, but have an evaporation rate and flash point which exclude their use as a sole additive to the toxicant. Table IV provides viscosity data for toxicants with 5% and 10% additions of the desired aromatic additive diluent. The aforementioned data is summarized in Tables II, III and IV presented below:

TABLE II

[Viscosity (cps.) of 50% (v./v.) solutions of the toxicants and at the temperature indicated with aerial heavy aromatic diluents]

| Ex. | Toxicant | Additive | Viscosity (in cps.) | | |
|---|---|---|---|---|---|
| | | | 45° F. | 76° F. | 120° F. |
| 4 | Butoxy Ethanol Ester of 2,4-Dichlorophenoxy Acetic Acid. | Heavy Aromatic Diluent— SP. G.=0.899, F.P.=150° F., M.A.P.=95° F., P.A.=69%. | 16.4 | 9.6 | 5.6 |
| 5 | do | Heavy Aromatic Diluent— SP.G=0.933, F.P.=152° F., M.A.P.=76.3° F., P.A.=85%. | 15.8 | 9.7 | 5.6 |
| 6 | do | Heavy Aromatic Diluent— SP.G.=1.004, F.P.=230° F., M.A.P.=57° F., P.A.=95+. | 27.1 | 12.0 | 7.2 |
| 7 | Dimethyl-1,2-dibromo-2,2-dichloroethyl phosphate. | Heavy Aromatic Diluent— SP.G.=0.899, F.P.=150° F., M.A.P.=95° F., P.A.=69%. | 12.9 | 9.1 | 5.6 |
| 8 | do | Heavy Aromatic Diluent— SP.G.=0.933, F.P.=152° F., M.A.P.=76.3° F., P.A.=85%. | 13.0 | 9.2 | 5.5 |
| 9 | do | Heavy Aromatic Diluent— SP.G.=1.004, F.P.=230° F., M.A.P.=57° F., P.A.=95+. | 19.0 | 11.8 | 7.1 |

SP.G.-specific gravity, F.P.=flash point, M.A.P.=mixed aniline point, P.A.=percent aromatics.

TABLE III

| Ex. | Aromatic Additive* | Temp., ° F. | Viscosity (cps.) at Indicated Malathion [Tech., (Percent V./V.)] Concentration | | | | |
|---|---|---|---|---|---|---|---|
| | | | 31.25 | 50.0 | 62.5 | 80.0 | 90.0 |
| 10 | Heavy Aromatic Diluent— SP.G.=1.004, F.P.=230° F., M.A.P.=57° F., P.A.=95%. | 45 | 12.6 | 20.6 | 28.4 | 45.0 | ---- |
| | | 77 | 8.0 | 11.2 | 13.9 | 18.7 | ---- |
| | | 120 | 4.9 | 6.1 | 7.2 | 9.6 | ---- |
| 11 | Heavy Aromatic Diluent— SP.G.=0.9965, F.P.=240° F., M.A.P.=53.8° F., P.A.=100%. | 45 | 11.7 | 18.2 | 25.6 | 43.0 | ---- |
| | | 77 | 7.3 | 10.2 | 13.2 | 17.6 | ---- |
| | | 120 | 4.4 | 5.8 | 6.8 | 8.9 | ---- |
| 12 | Heavy Aromatic Diluent— SP.G.=0.933, F.P.=152° F., M.A.P.=76.3° F., P.A.=85%. | 45 | 8.0 | 12.2 | 19.0 | 38.0 | ---- |
| | | 77 | 5.7 | 8.2 | 10.8 | 16.0 | ---- |
| | | 120 | 3.8 | 4.9 | 6.0 | 8.4 | ---- |
| 13 | Heavy Aromatic Diluent— SP.G.=0.910, F.P.=125° F., M.A.P.=48.3 straight, P.A.=75%. | 45 | 11.4 | 16.2 | 24.0 | 44.9 | ---- |
| | | 77 | 6.9 | 9.8 | 12.3 | 17.6 | ---- |
| | | 120 | 4.4 | 5.6 | 6.7 | 8.9 | ---- |
| 14 | Heavy Aromatic Diluent— SP.G.=0.899, F.P.=150° F., M.A.P.=95° F., P.A.=69%. | 45 | 7.8 | 12.6 | 18.3 | 35.6 | ---- |
| | | 77 | 5.4 | 8.1 | 10.6 | 16.1 | ---- |
| | | 120 | 3.5 | 4.8 | 6.2 | 8.2 | ---- |
| 15 | 20% Methanol | 45 | ---- | ---- | ---- | 12.5 | ---- |
| | | 74 | ---- | ---- | ---- | 8.1 | ---- |
| | | 120 | ---- | ---- | ---- | 5.1 | ---- |
| 16 | 10% Methanol; 10% Heavy Aromatic Diluent— SP.G.=0.899, F.P.=150° F., M.A.P.=95° F., P.A.=69%. | 45 | ---- | ---- | ---- | 18.4 | ---- |
| | | 72 | ---- | ---- | ---- | 11.1 | ---- |
| | | 120 | ---- | ---- | ---- | 6.1 | ---- |
| 17 | 5% Methanol; 15% Heavy Aromatic Diluent— SP.G.=0.899, F.P.=150° F., M.A.P.=95° F., P.A.=69%. | 45 | ---- | ---- | ---- | 22.9 | ---- |
| | | 72 | ---- | ---- | ---- | 13.1 | ---- |
| | | 120 | ---- | ---- | ---- | 7.0 | ---- |
| 18 | 10% Methanol | 45 | ---- | ---- | ---- | ---- | 24.1 |
| | | 75 | ---- | ---- | ---- | ---- | 13.4 |
| | | 120 | ---- | ---- | ---- | ---- | 7.6 |

*Where SP.G., F.P., M.A.P. and P.A. are defined as in Table II.

TABLE IV

| Ex. | Sample | Viscosity (in cps.) | | |
|---|---|---|---|---|
| | | 45° F. | 77° F. | 120° F. |
| 19 | 95% O,O-dimethylphosphorodithioate of diethyl mercaptosuccinate, 5% Heavy Aromatic Diluent*—SP.G.=0.899, F.P.=150° F., M.A.P.=95° F., P.A.=69%. | 75.0 | 25.5 | 10.9 |
| 20 | 90% O,O-dimethylphosphorodithioate of diethyl mercaptosuccinate, 10% Heavy Aromatic Diluent—SP.G.=0.899, F.P.=150° F., M.A.P.=95° F., P.A.=69%. | 62.5 | 22.0 | 9.9 |
| 21 | 95% Dimethyl-1,2-dibromo-2,2-dichloroethyl phosphate, 5% Heavy Aromatic Diluent—SP.G.=0.899, F.P.=150° F., M.A.P.=95° F., P.A.=69%. | 70.5 | 26.0 | 13.7 |
| 22 | 90% Dimethyl-1,2-dibromo-2,2-dichloroethyl phosphate, 10% Heavy Aromatic Diluent—SP.G.=0.899, F.P.=150° F., M.A.P.=95° F., P.A.=69%. | 54.3 | 22.5 | 12.3 |
| 23 | 95% Butoxy Ethanol Ester of 2,4-Dichlorophenoxy Acetic Acid, 5% Heavy Aromatic Diluent—SP.G.=0.899, F.P.=150° F., M.A.P.=95° F., P.A.=69%. | 161.0 | 43.0 | 16.0 |
| 24 | 90% Butoxy Ethanol Ester of 2,4-Dichlorophenoxy Acetic Acid, 10% Heavy Aromatic Diluent—SP.G.=0.899, F.P.=150° F., M.A.P.=95° F., P.A.=69%. | 149.0 | 36.0 | 14.0 |

*Where SP.G., F.P., M.A.P. and P.A. are defined as in Table II.

*Example 25*

The additives of diluents listed in Table V below are tested for rate of evaporation using a Brabender semi-automatic moisture teller with the heating element removed and the air blower at full force. Ten-gram samples are weighed into tared aluminum pans, reweighed at the indicated intervals and losses recorded. Table V summarizes the percent loss of each diluent at various intervals over a six-hour period. Evaporation rates are run at 24.5° C. to 25.5° C. and approximately 48% relative humidity. Although certain of the fuel and diesel oils tested meet the requirement with regard to evaporation rate, as summarized in Table V below, nonetheless such oils do not meet the requirements as to miscibility with respect to insecticides and herbicides of the invention.

phosphorodithioate of diethyl mercaptosuccinate containing 16 ounces of toxicant in one gallon of water. A second composition employed is a standard 5% granular (i.e., 16 ounces of the above-mentioned toxicant per twenty pounds of composition) applied at twenty pounds per acre. A third composition is prepared in accordance with the present invention and comprises 16 ounces of O,O-dimethylphosphorodithioate of diethyl mercaptosuccinate made up to one quart with a heavy aromatic diluent possessing: (a) a specific gravity of 1.004, (b) a flash point of 230° F., (c) 95% aromatics, (d) an aniline point of 57° F. and (e) an evaporation point of 2% in six hours at 25° C. and 48% R.H. These compositions are applied to respective fields by aerial application at 50 feet elevation at the respective rates of one gallon of emulsi- TABLE V
[Percent solvent evaporated at 24.5–25.5° C.—Relative humidity approximately 48%]

| Test Diluent Additives | Time (in hours) | | | | |
|---|---|---|---|---|---|
| | 1.0 | 2.0 | 3.0 | 4.0 | 6.0 |
| Toluene | 99 | | | | |
| Xylene | 38.5 | 74.1 | 99.9 | | |
| Heavy Aromatic Diluent—SP.G.=0.893, F.P.=143, M.A.P.=62.5, P.A.=96 | 3.2 | 6.6 | 10.5 | 13.6 | 21.1 |
| Fuel Oil #1* | 3.6 | 6.7 | 9.4 | 11.5 | 15.1 |
| Heavy Aromatic Diluent—SP.G.=0.899, F.P.=150, M.A.P.=95, P.A.=69 | 2.5 | 5.8 | 7.8 | 10.0 | 14.1 |
| Fuel Oil #2* | 2.9 | 5.6 | 7.8 | 9.4 | 12.0 |
| Oil Diesel #1* | 2.9 | 5.2 | 7.3 | 9.2 | 12.1 |
| Fuel Oil #2* | 1.4 | 3.3 | 4.7 | 5.9 | 7.8 |
| Heavy Aromatic Diluent—SP.G.=0.986, F.P.=180–210, M.A.P.=64, P.A.=93 | 0.7 | 2.6 | 3.3 | 4.6 | 7.1 |
| Deodorized Kerosene * | 0.4 | 1.8 | 3.1 | 4.4 | 6.6 |
| Fuel Oil #2* | 1.0 | 2.4 | 3.4 | 4.4 | 5.8 |
| Circle Diesel * | 0.5 | 1.3 | 2.1 | 2.7 | 3.8 |
| Heavy Aromatic Diluent—SP.G.=1.004, F.P.=230, M.A.P.=57, P.A.=95+ | 0.0 | 0.0 | 0.3 | 0.9 | 2.0 |
| Heavy Aromatic Diluent—SP.G.=0.91, F.P.=125+, M.A.P.=48.3, P.A.=75 | 0.0 | 0.5 | 0.6 | 1.1 | 1.9 |
| Heavy Aromatic Diluent—SP.G.=0.9965, F.P.=240, M.A.P.=53.8, P.A.=100 | 0.0 | 0.0 | 0.0 | 0.3 | 1.0 |
| Heavy Aromatic Diluent—SP.G.=1.03, F.P.=345, M.A.P.=60, P.A.=75+ | 0.0 | 0.0 | 0.0 | 0.0 | 0.0 |

* Not sufficiently miscible with the insecticides and herbicides of the instant invention to be included within the scope of the invention although the evaporation rate meets specifications.
SP.G.=Specific Gravity, F.P.=Flash Point, M.A.P.=Mixed Aniline Point, P.A.=Percent Aromatics.

*Example 26*

In this example, corn fields infested with partially aestivating adult cereal leaf beetles are selected for treatment. Pre-counts for infestation with the above insect are made in each field and recorded. Three compositions for comparison treatments are prepared and applied to the selected fields by aerial application from 50 feet elevation. The first composition prepared is a conventional aqueous solution (i.e., emulsifiable concentrate) of O,O-dimethylfiable concentrate per acre, twenty pounds of granular per acre and one quart per acre of composition of the invention.

At one-, five- and eight-day intervals after application, from ten to twenty corn plants are randomly selected and mortality counts are made on these plants. Percent kill is determined by comparison with pre-counts for the particular field treated. The results obtained are recorded in Table VI.

TABLE VI

| Toxicant | Formulation | Total Volume per Acre | Percent Kill After Treatment | | |
|---|---|---|---|---|---|
| | | | 1 day | 5 days | 8 days |
| O,O-dimethylphosphorodithioate of diethyl mercaptosuccinate. | Emulsifiable concentrate | 1 gal | Nil | Nil | Nil |
| Do | 5% granular | 20 lbs | 13 | 44 | 50 |
| Do | In aromatic diluent | 1 qt | 60 | 80 | 85 |

Example 27

An emulsifiable concentrate of 1-naphthyl methylcarbamate (one pound in one gallon of water) and the composition of the present invention comprising sixteen ounces of O,O-dimethylphosphorodithioate of diethyl mercaptosuccinate made up to one quart with a heavy aromatic solvent having a specific gravity of 1.004, a flash point of 230° F., a mixed aniline point of 57° F. and percent aromatic equal to 95% are compared. These are applied to corn fields by aerial application at 50 feet elevation. Two and four days after treatment corn plants are cut, placed in isolated containers and infested with adult cereal leaf beetles. One and two days after infestation mortality counts are made and percent mortality is calculated. The results appear in Table VII below,

TABLE VII

| Toxicant | Volume per Acre | Toxicant, lbs./Acre | Percent Kill | | | |
|---|---|---|---|---|---|---|
| | | | 2-day assay | | 4-day assay | |
| | | | 24 hrs. | 48 hrs. | 24 hrs. | 48 hrs. |
| 1-naphthyl methyl carbamate | 1 gal | 1.0 | 0 | 18 | 0 | 2 |
| O,O-dimethyl-phosphorodithioate of diethyl mercaptosuccinate. | 1 qt | 1.0 | 46 | 82 | 14 | 32 |

From the above, it is clear that small amounts of phosphate ester can be aerially applied to effectively control insects.

We claim:

1. A pesticidal composition adapted for use in aerial distribution and having a stable viscosity over a temperature range between about 40° F. and 120° F. consisting of at least 5% but not more than about 95% by volume of:
   (1) a toxicant selected from the group consisting of
   [A] a phosphate insecticide of the structure:

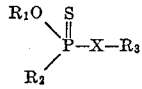

wherein $R_1$ is lower alkyl; $R_2$ is selected from the group consisting of lower alkyl, aryl and alkoxy; $R_3$ is a substituent selected from the class consisting of lower alkyl, substituted alkyl, nitro-substituted phenyl, chloro-substituted phenyl and a 5- to 6-membered heterocyclic; and X is a substituent selected from the group consisting of oxygen and sulfur; and
   [B] a phenoxyacetic acid ester herbicide of the structure:

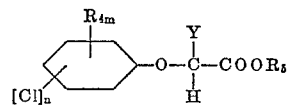

wherein $R_4$ is selected from the group consisting of alkyl, chloroalkyl and chlorophenyl; $R_5$ is a substituent selected from the group consisting of hydrogen, alkyl and alkoxy-alkyl; Y is a substituent selected from the group consisting of hydrogen and alkyl; n is an integer from 1 to 3 and m is an integer from 0 to 1; and
   (2) from 95% to about 5% by volume of an aromatic diluent additive possessing the following properties:
      (a) a mixed aniline point of above about 30° F. but not more than about 95° F.;
      (b) an aromatic content ranging from about 60% to about 100%;
      (c) a specific gravity at 60°/60° F. exceeding about 0.880 but not more than about 1.5;
      (d) an evaporation rate not exceeding about 25% in six hours at 25° C. and 48% relative humidity (R.H.); and
      (e) a flash point above about 125° F.

2. A pesticidal composition according to claim 1, wherein at least 20% by volume of said toxicant but not more than 80% by volume and the remainder being said aromatic additive diluent, are admixed.

3. A pesticidal composition according to claim 1, wherein 50% by volume of said toxicant and 50% by volume of said aromatic additive are admixed.

4. A pesticidal composition according to claim 1, wherein the toxicant is S-(1,2-dicarboethoxyethyl) O,O-dimethyl phosphorodithioate.

5. A pesticidal composition according to claim 1, wherein the toxicant is O,O-diethyl S-(ethylthiomethyl) phosphorodithioate.

6. A pesticidal composition according to claim 1, wherein the toxicant is O,O-dimethyl O-p-nitrophenyl phosphorodithioate.

7. A pesticidal composition according to claim 1, wherein the toxicant is butoxyethyl ester of 2,4-dichlorophenoxyacetic acid.

8. A pesticidal composition according to claim 1, wherein the toxicant is isopropyl ester of 2,4-dichlorophenoxyacetic acid.

9. In a method for effecting the stabilization of viscosity of toxicants selected from the group consisting of
   [A] a phosphate insecticide of the structure:

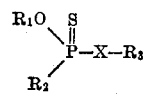

wherein $R_1$ is lower alkyl; $R_2$ is selected from the group consisting of lower alkyl, aryl and alkoxy; $R_3$ is a substituent selected from the class consisting of lower alkyl, substituted alkyl, nitro-substituted phenyl, chloro-substituted phenyl and a 5- to 6-membered heterocyclic; and X is a substituent selected from the group consisting of oxygen and sulfur; and

[B] a phenoxyacetic acid ester herbicide of the structure:

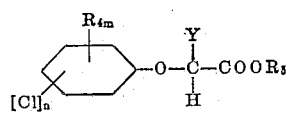

wherein $R_4$ is selected from the group consisting of alkyl, chloroalkyl and chlorophenyl; $R_5$ is a substituent selected from the group consisting of hydrogen, alkyl and alkoxy-alkyl; Y is a substituent selected from the group consisting of hydrogen and alkyl; $n$ is an integer from 1 to 3 and $m$ is an integer from 0 to 1; the improvement which consists of: admixing between about 5% and about 95% by volume of said toxicant and from not more than 95% but not less than 5% by volume of an aromatic diluent additive having the following properties:
    (a) a mixed aniline point of above about 30° F. but not more than about 95° F.;
    (b) an aromatic content ranging from about 60% to about 100%;
    (c) a specific gravity at 60°/60° F. exceeding about 0.880 but not more than about 1.5;
    (d) an evaporation rate not exceeding about 25% in six hours at 25° C. and 48% relative humidity (R.H.); and
    (e) a flash point above about 125° F.,
resultant composition having a stable viscosity over a wide temperature range from between about 40° F. and 120° F.

10. A process according to claim 9, wherein about 50% by volume of the aromatic diluent and about 50% by volume of the toxicant are admixed.

11. A process according to claim 9, wherein the toxicant is S-(1,2-dicarboethoxyethyl) O,O-dimethyl phosphorodithioate.

12. A process according to claim 9, wherein the toxicant is O,O-diethyl S-(ethylthiomethyl) phosphorodithioate.

13. A process according to claim 9, wherein the toxicant is O,O-dimethyl O-p-nitrophenyl phosphorodithioate.

14. A process according to claim 9, wherein the toxicant is butoxyethyl ester of 2,4-dichlorophenoxyacetic acid.

15. A process according to claim 9, wherein the toxicant is isopropyl ester of 2,4-dichlorophenoxyacetic acid.

References Cited

UNITED STATES PATENTS

| | | | |
|---|---|---|---|
| 2,447,475 | 8/1948 | Kaberg et al. | 71—2.3 |
| 2,509,233 | 5/1950 | Kaberg et al. | 71—2.3 |
| 2,586,681 | 2/1952 | McKay et al. | 71—2.3 |
| 2,646,350 | 7/1953 | Rostler | 71—2.3 |
| 3,240,585 | 3/1966 | Slefcik et al. | 71—2.6 |
| 3,248,459 | 4/1966 | Lorenz | 260—940 |

LEWIS GOTTS, *Primary Examiner.*

JAMES O. THOMAS, Jr., *Examiner.*